United States Patent
Huang

(10) Patent No.: US 12,441,502 B1
(45) Date of Patent: Oct. 14, 2025

(54) VACUUM SEALER

(71) Applicant: Mao-Sen Huang, Taichung (TW)

(72) Inventor: Mao-Sen Huang, Taichung (TW)

( * ) Notice: Subject to any disclaimer, the term of this patent is extended or adjusted under 35 U.S.C. 154(b) by 0 days.

(21) Appl. No.: 18/946,308

(22) Filed: Nov. 13, 2024

(51) Int. Cl.
   *B65B 51/10* (2006.01)
   *B65B 31/00* (2006.01)

(52) U.S. Cl.
   CPC .............. *B65B 51/10* (2013.01); *B65B 31/00* (2013.01)

(58) Field of Classification Search
   CPC ......... B65B 51/10; B65B 51/14; B65B 31/00; B65B 2051/105; B29C 65/02; B29C 65/22; B29C 65/222; B29C 65/224; B29C 65/228; B29C 66/1122; B29C 66/849; B29C 66/43121; B29C 66/00145; B29C 66/112; B29C 66/8324; H05B 3/00; H05B 3/64
   See application file for complete search history.

(56) References Cited

U.S. PATENT DOCUMENTS

| | | | | |
|---|---|---|---|---|
| 2,990,872 A | * | 7/1961 | Gaby | B27D 3/00 100/211 |
| 3,116,393 A | * | 12/1963 | Hachmeister | B29C 65/18 53/375.9 |
| 3,564,810 A | * | 2/1971 | Faletti | B29C 66/431 100/17 |
| 3,573,140 A | * | 3/1971 | Griffith | B29C 66/1142 156/583.2 |
| 3,687,789 A | * | 8/1972 | Wheeler | B29C 66/91212 156/359 |
| 3,703,427 A | * | 11/1972 | Sellers | B29C 66/81419 156/359 |
| 3,888,719 A | * | 6/1975 | Gibbs | B32B 37/1018 100/319 |
| 3,912,575 A | * | 10/1975 | Zelnick | B29C 65/7441 493/203 |
| 3,916,148 A | * | 10/1975 | LaFleur | B29C 66/91231 493/379 |
| 4,010,063 A | * | 3/1977 | Natter | B29C 65/228 83/544 |
| 4,106,973 A | * | 8/1978 | Wright | B29C 65/18 228/904 |
| 4,223,513 A | * | 9/1980 | Mahaffy | B65B 31/021 53/DIG. 1 |
| 5,149,943 A | * | 9/1992 | Kupcikevicius | B29C 66/80 219/243 |

(Continued)

*Primary Examiner* — Dariush Seif
(74) *Attorney, Agent, or Firm* — LANWAY IPR SERVICES; Chun-Ming Shih

(57) ABSTRACT

A vacuum sealer includes a housing including a front platform; a rear pumping device including two contact switches on the platform and a controller electrically to the contact switches; a pivotal presser; and a heating assembly in the platform. Either end of the heating assembly includes a U-shaped first metal member including two wings, a thermal insulation member including an internally threaded metal member through the thermal insulation member, a second metal member including a hole, a first tubular heat sink, a first screw for fastening the U-shaped first metal member, the heating wire, and the first tubular heat sink together, a plate-shaped third heat sink attached to an end of the first tubular heat sink, a heating plate placed on the third heat sink, and a second screw for fastening the second metal member, the thermal insulation member, and the U-shaped first metal member together.

3 Claims, 10 Drawing Sheets

(56) References Cited

U.S. PATENT DOCUMENTS

| | | | | |
|---|---|---|---|---|
| 5,177,937 | A * | 1/1993 | Alden | B29C 66/9141 |
| | | | | 53/76 |
| 5,239,808 | A * | 8/1993 | Wells | B65B 31/024 |
| | | | | 53/512 |
| 5,638,664 | A * | 6/1997 | Levsen | B65B 31/046 |
| | | | | 53/512 |
| 6,088,996 | A * | 7/2000 | Maruyama | B65B 51/148 |
| | | | | 53/375.9 |
| 6,352,095 | B1 * | 3/2002 | Fulmer | B29C 53/18 |
| | | | | 156/583.1 |
| 6,450,088 | B1 * | 9/2002 | Hutchinson | B29C 66/828 |
| | | | | 219/544 |
| 6,789,371 | B1 * | 9/2004 | Buysman | B29C 65/222 |
| | | | | 53/550 |
| 7,134,259 | B2 * | 11/2006 | Huang | B65B 31/046 |
| | | | | 53/512 |
| 7,383,676 | B1 * | 6/2008 | Schmidt | B65B 9/026 |
| | | | | 53/553 |
| 7,540,127 | B2 * | 6/2009 | Sung | B65B 31/047 |
| | | | | 53/434 |
| 8,069,637 | B2 * | 12/2011 | Taylor, Sr. | B29C 66/348 |
| | | | | 53/434 |
| 9,227,742 | B2 * | 1/2016 | Chiu | B65B 7/06 |
| 9,434,106 | B2 * | 9/2016 | Selle | B29C 66/0044 |
| 9,486,971 | B2 * | 11/2016 | Zieger | B29C 65/782 |
| 10,421,567 | B2 * | 9/2019 | Bocks | B65B 31/024 |
| 10,661,933 | B2 * | 5/2020 | Bocks | B65B 31/024 |
| 2004/0139701 | A1 * | 7/2004 | Cady | B65B 31/024 |
| | | | | 53/434 |
| 2004/0256058 | A1 * | 12/2004 | Irwin | B29C 66/348 |
| | | | | 493/189 |
| 2004/0256373 | A1 * | 12/2004 | Irwin | B29C 66/8122 |
| | | | | 219/243 |
| 2021/0008814 | A1 * | 1/2021 | Hishinuma | B29C 66/91421 |

* cited by examiner

VACUUM SEALER

FIELD OF THE INVENTION

The invention relates to sealers and more particularly to a vacuum sealer used for a plastic bag.

BACKGROUND OF THE INVENTION

A conventional vacuum sealer comprises a heating element, a heat sink, and a member interconnecting the heating element and the heat sink. However, the suspended interconnecting member tends to break due to overheat during operation.

U.S. Pat. No. 7,134,259 to Huang, entitled "vacuum sealer" discloses a heating plate which is structurally simple. However, the dissipation performance of the heating plate is not good.

Thus, the need for improvement still exists.

SUMMARY OF THE INVENTION

It is therefore one object of the invention to provide a vacuum sealer comprising a housing comprising a platform at a front portion; a pumping device disposed in a rear portion of the housing and comprising two contact switches on a flat portion of a top of the platform and a controller electrically to the contact switches; a presser pivotally disposed on the platform; and a heating assembly disposed at a front end of the platform and electrically to the controller, either end of the heating assembly comprising a U-shaped first metal member including two wings wherein one wing has a hole, a thermal insulation member including an internally threaded metal member through the thermal insulation member, a second metal member including a hole, a first tubular heat sink, a first screw driven through the hole of one wing and an end of a heating wire into the first tubular heat sink to fasten the U-shaped first metal member, the heating wire, and the first tubular heat sink together, a plate-shaped third heat sink having one end bent and attached to an end of the first tubular heat sink, a heating plate placed on the third heat sink, and a second screw driven through the hole of the second metal member into the internally threaded metal member wherein a joined portion of the thermal insulation member and the other wing is fastened together by soldering, thereby fastening the second metal member, the thermal insulation member, and the U-shaped first metal member together.

The above and other objects, features and advantages of the invention will become apparent from the following detailed description taken with the accompanying drawings.

DETAILED DESCRIPTION OF THE INVENTION

Figure 1:
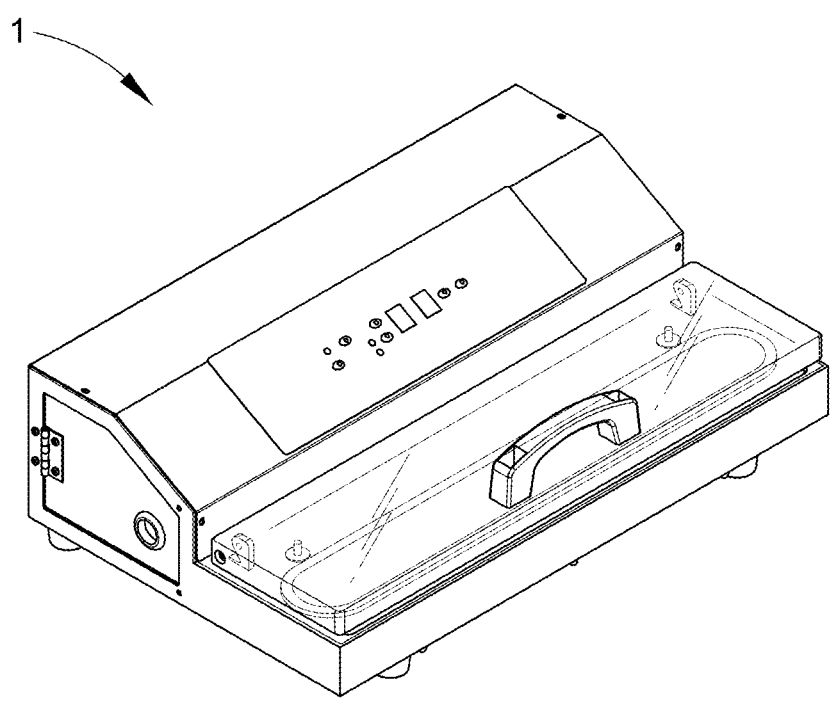
FIG. 1 is a perspective view of a vacuum sealer according to the invention.
Figure 2:
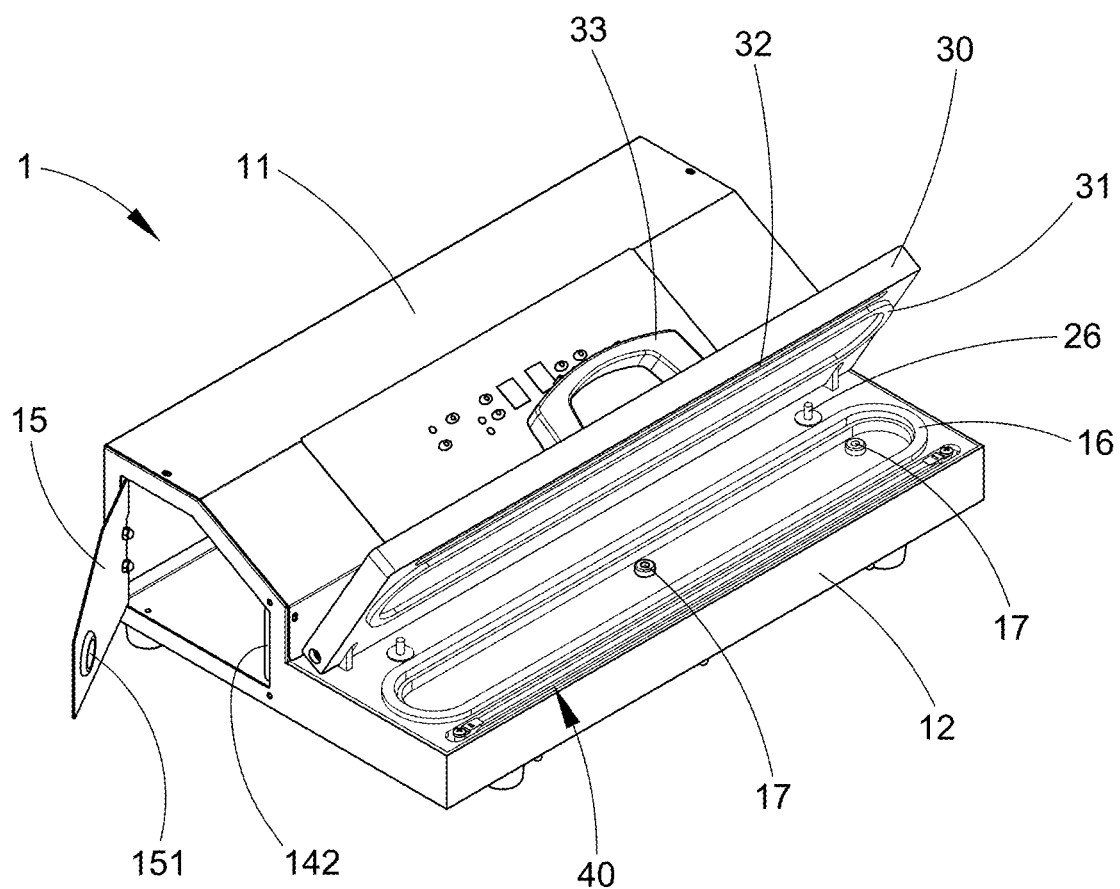
FIG. 2 is a perspective view of the vacuum sealer when the presser is lifted and the door is opened.
Figure 3:
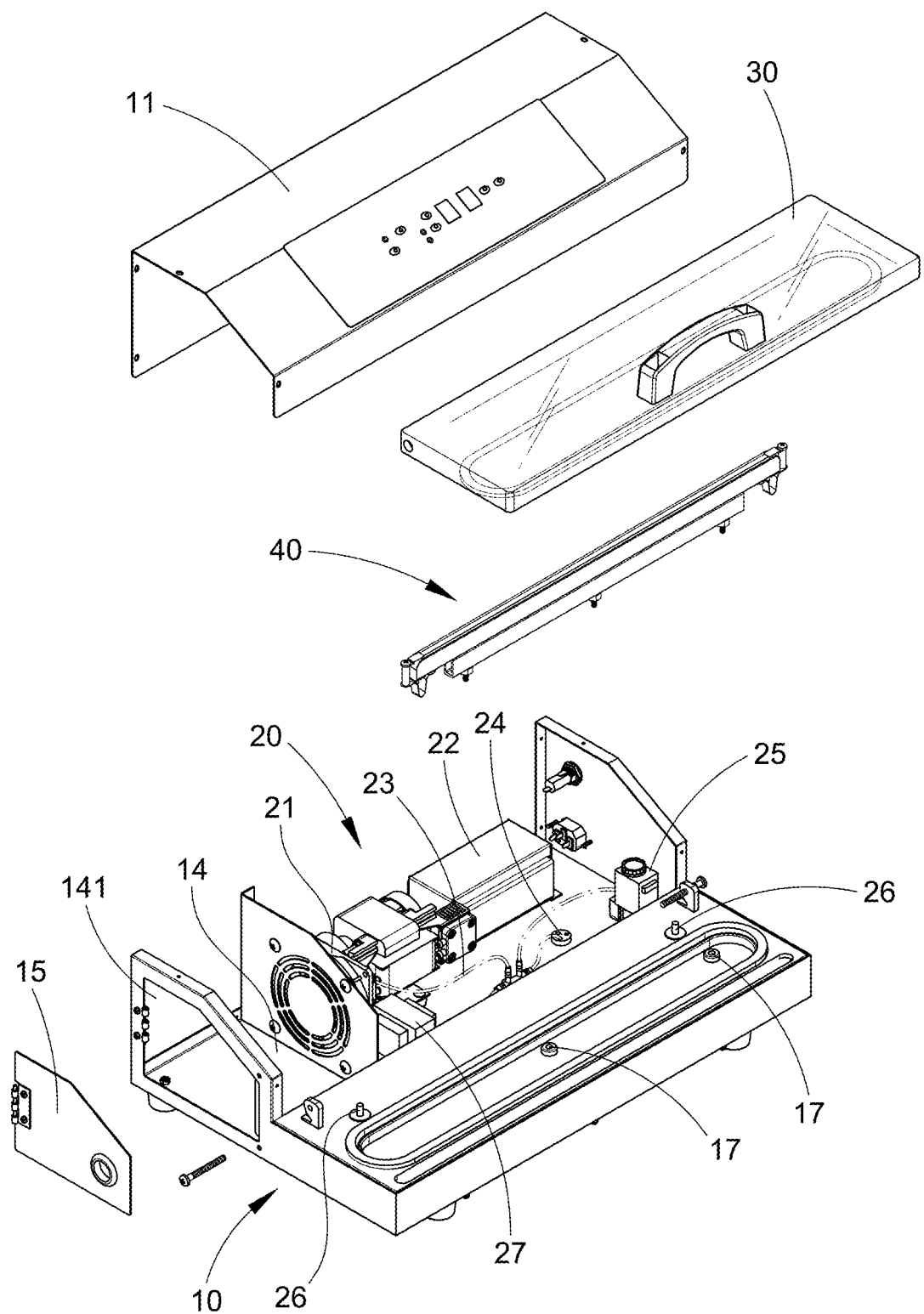
FIG. 3 is an exploded perspective view of the vacuum sealer.
Figure 4:
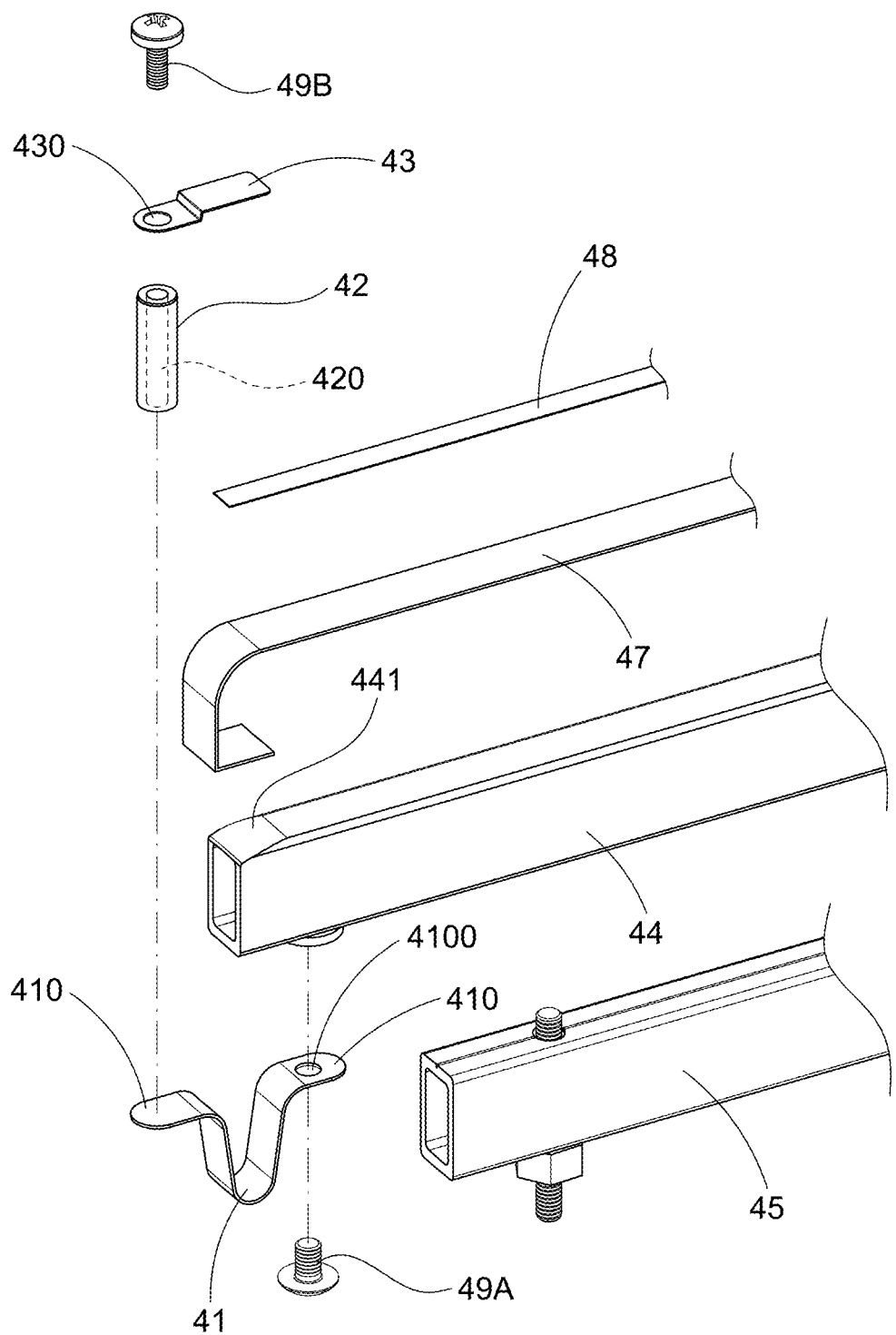
FIG. 4 is an exploded view of the heating assembly.
Figure 5:
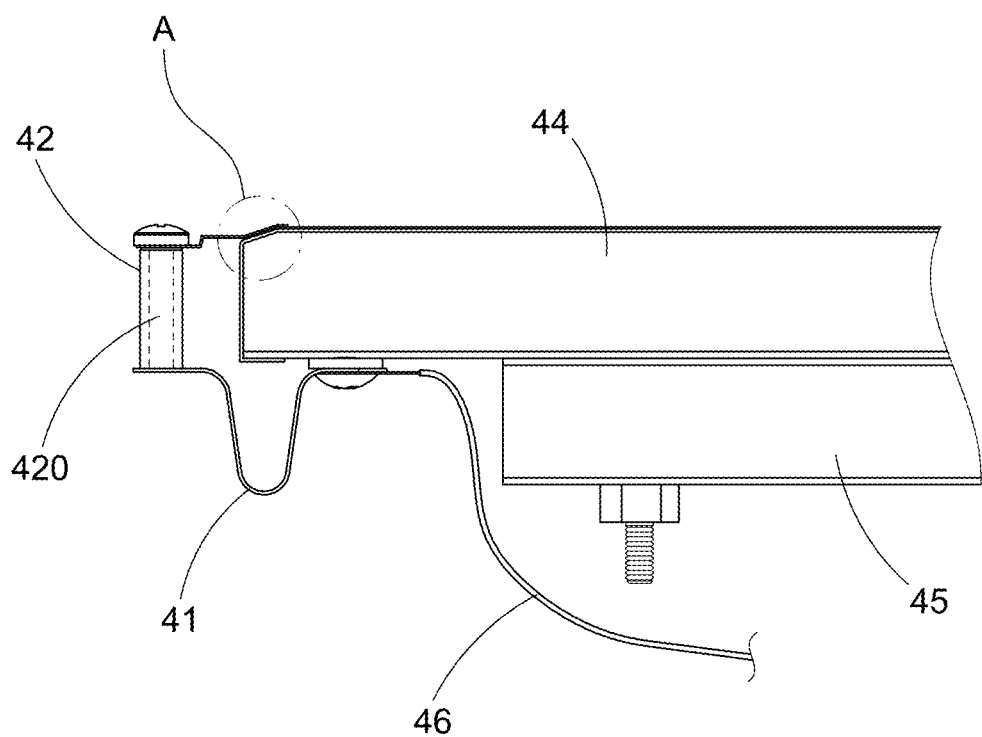
FIG. 5 is a front view of the assembled heating assembly.
Figure 6:
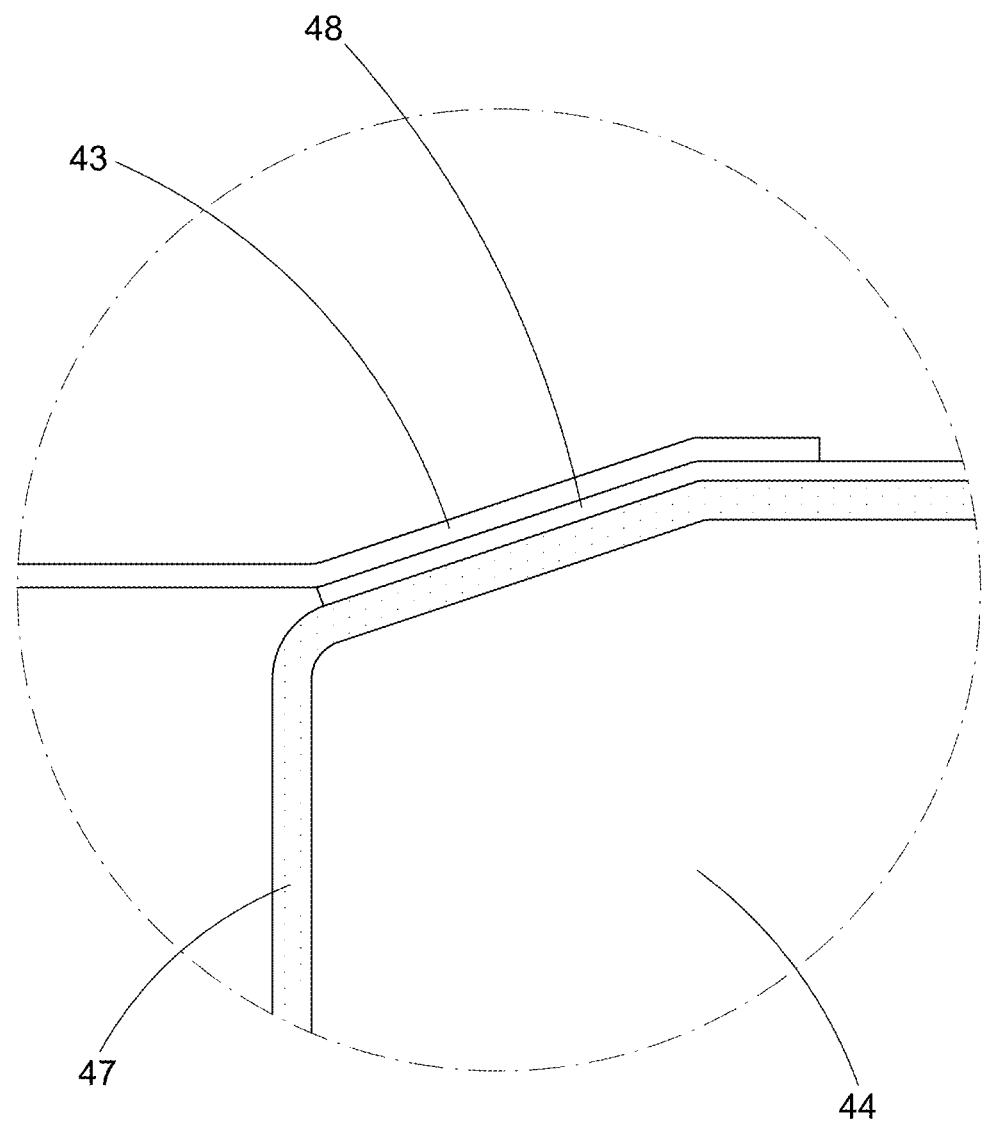
FIG. 6 is a detailed view of the area of circle A in FIG. 5.
Figure 7:
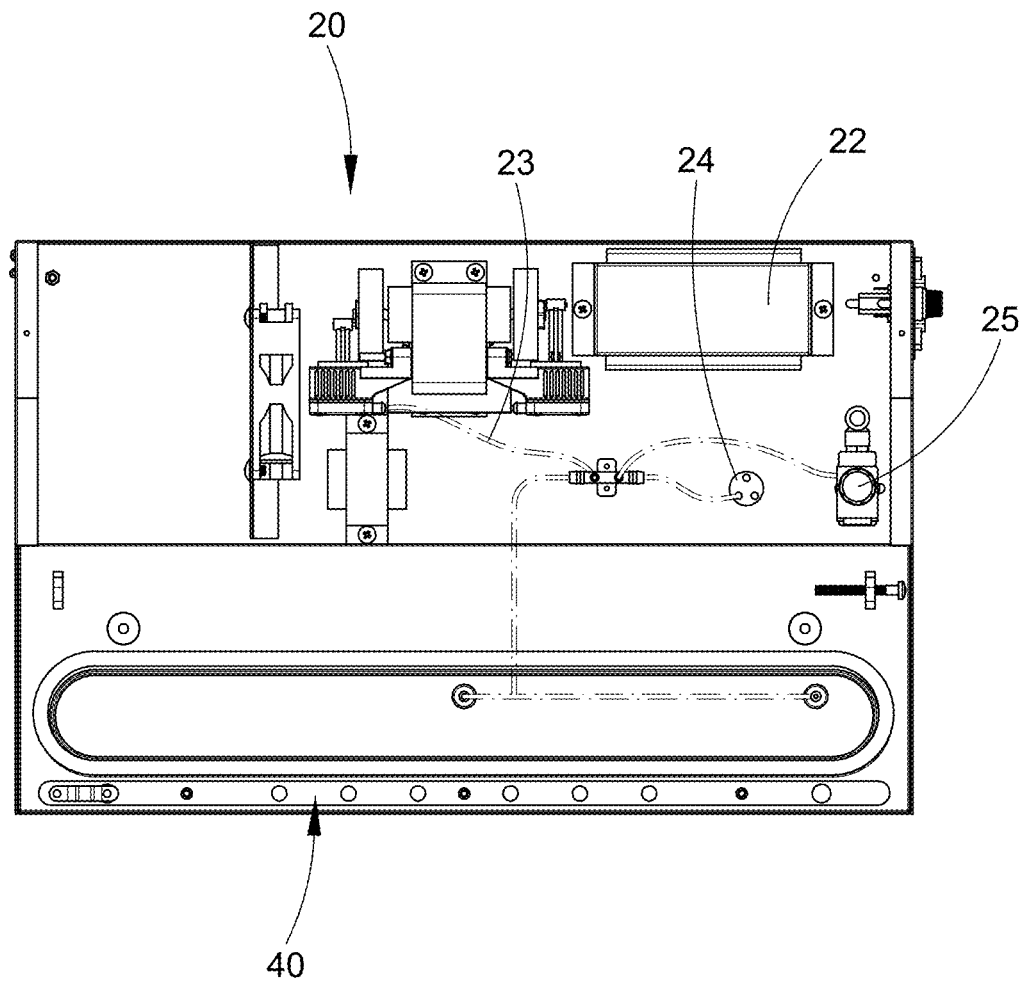
FIG. 7 is a top plan view of the vacuum sealer when both the cover and the presser are removed.
Figure 8:
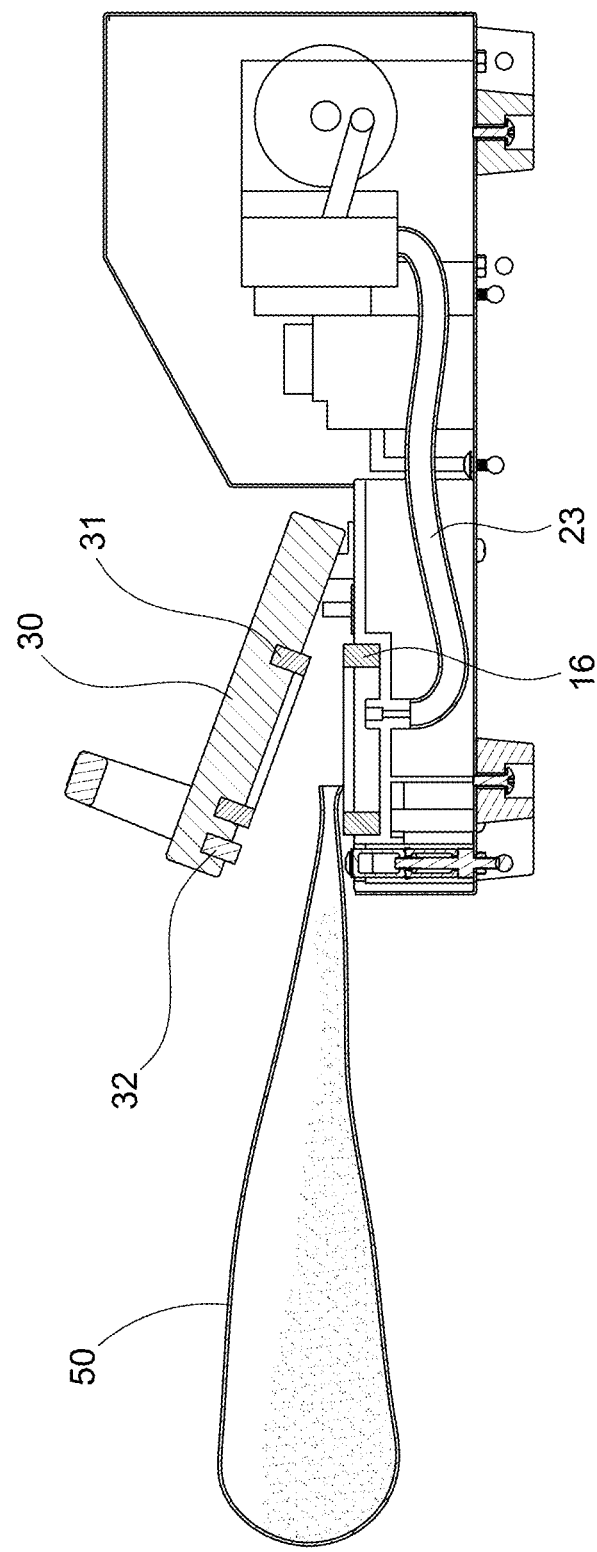
FIG. 8 is a side cross-sectional view of the vacuum sealer before operation.
Figure 9:
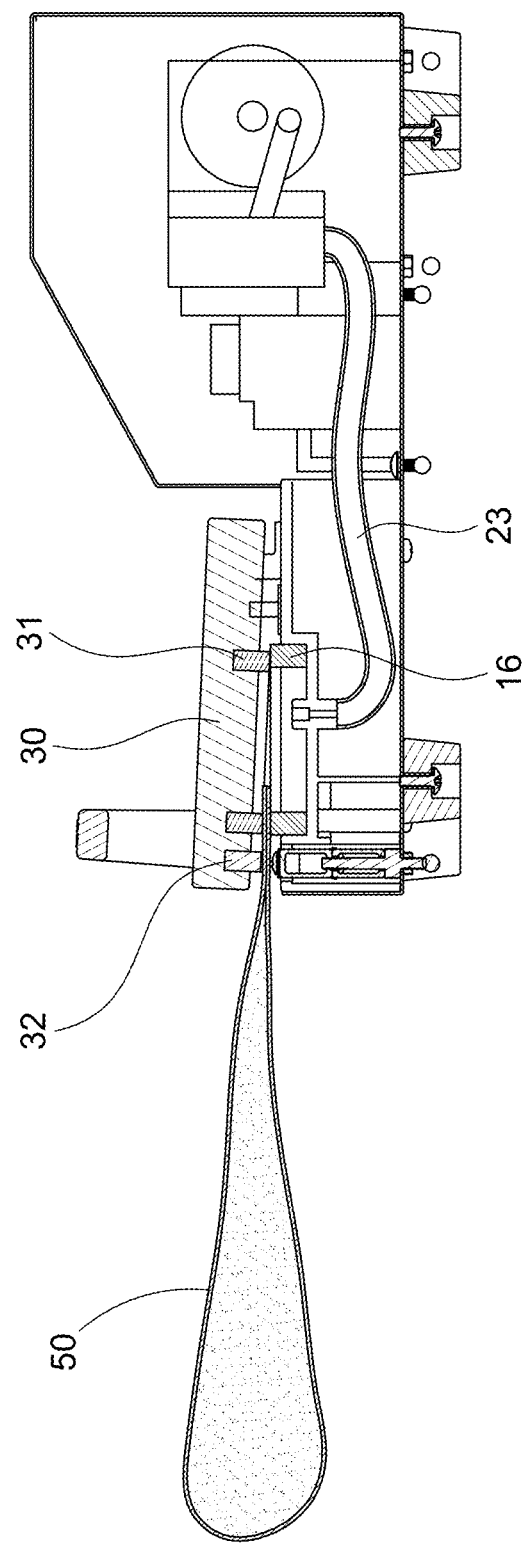
FIG. 9 is a side cross-sectional view of the vacuum sealer during operation.
Figure 10:
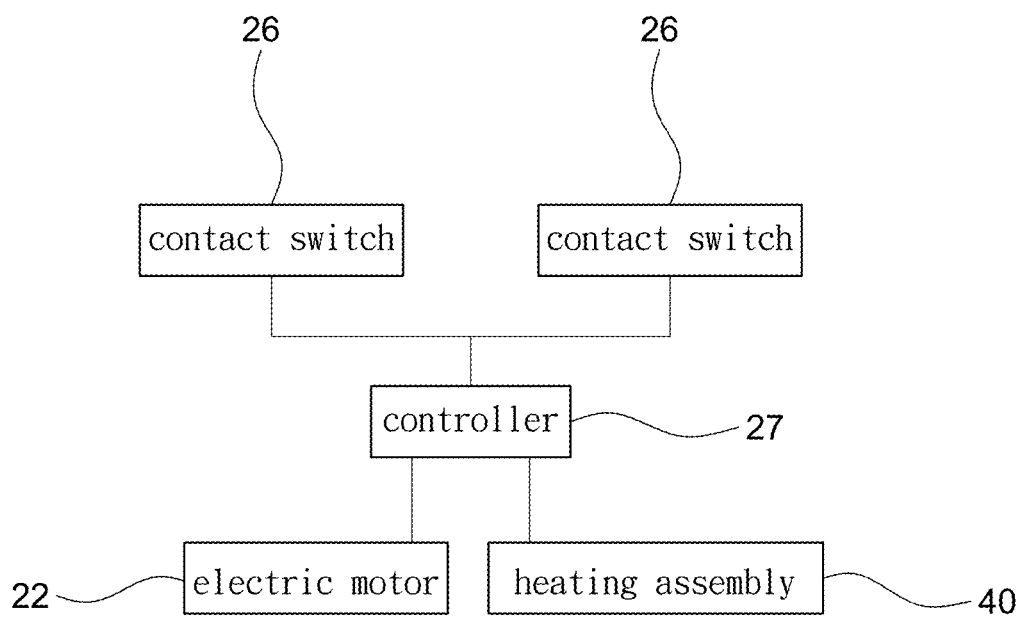
FIG. 10 is a block diagram of the components of the vacuum sealer for a bag sealing operation.

Referring to FIGS. 1 to 10, a vacuum sealer 1 in accordance with the invention is provided to seal a plastic bag 50 and comprises a housing 10, a pumping device 20 disposed in a rear portion of the housing 10, and a presser 30 pivotally mounted on a platform 12 at a front portion of the housing 10.

The housing 10 further comprises a first sealing ring 16 secured on the platform 12, two suction holes 17 in a recessed portion of a top of the platform 12 and surrounded by the first sealing ring 16, a first compartment 13 in the rear portion with the pumping device 20 disposed therein, a second compartment 14 beside the first compartment 13 for receiver power cord, etc., the second compartment 14 having a side opening 141 and a magnet 142 adjacent to the side opening 141, a metal door 15 having a bore 151 through the metal door 15, the metal door 15 pivotally mounted on the opening 141 and being capable of closing the side opening 141 by attracting the magnet 142 or opening the side opening 141 by inserting a finger through the bore 151 and pulling the metal door 15, and a cover 11 threadedly secured to a top of the housing 10 for closing the first compartment 13 and the second compartment 14.

The pumping device 20 includes a fan 21, an electric motor 22 operatively connected to the fan 21 and being capable of activating the fan 21, a tube 23 having a first end extending into the platform 12 and communicating with the suction holes 17 and a second end connected to an output of the fan 21, a pressure sensor 24 connected to the tube 23, an electromagnetic valve 25 electrically connected to the pressure sensor 24, two contact switches 26 on a flat portion of the top of the platform 12, and a controller 27 electrically connected to the electric motor 22 and the contact switches 26 respectively.

The presser 30 is transparent and has a size corresponding to that of the platform 12. The presser 30 has a rear side pivotally mounted on the platform 12 and selectively pressed on the top of the platform 12. The presser 30 includes a second sealing ring 31 secured on a bottom. The second sealing ring 31 can be fully pressed on the first sealing ring 16 and the pressure sensor 24 is provided to sense the pressure between the first sealing ring 16 and the second sealing ring 31 when the presser 30 is pressed on the platform 12. The presser 30 further comprises a thermal insulator wicker 32 attached to a bottom thereof beside the second sealing ring 31, and a handle 33 on a top for user to easily operate the presser 30.

The vacuum sealer 1 further comprises a heating assembly 40 which is the subject of the invention in addition to the contact switches 26. The heating assembly 40 is discussed in detail below. The heating assembly 40 is disposed between the first sealing ring 16 and a front edge of the platform 12. The heating assembly 40 is electrically connected to the controller 27. Either end portion of the heating assembly 40 comprises a U-shaped first metal member 41 including two wings 410 in which one wing 410 has a hole 4100, a thermal insulation member 42 including an internally threaded metal member 420 through the thermal insulation member 42, a second metal member 43 including a hole 430, first and second tubular heat sinks 44, 45 made of aluminum and threadedly secured together in which the first tubular heat sink 44 has an inclined surface 441, a first screw 49A driven through the hole 4100 and an end of a heating wire 46 into the first tubular heat sink 44 to fasten the U-shaped first metal member 41, the heating wire 46, and the first tubular heat sink 44 together, a plate-shaped third heat sink 47 having one end bent and attached to one end of the first tubular heat sink 44, a heating plate 48 placed on the third heat sink 47, and a second screw 49B driven through the hole 430 of the second metal member 43 into the internally threaded metal member 420 in which a joined portion of the thermal insulation member 42 and the other wing 410 is fastened together by soldering, thereby fastening the second metal member 43, the thermal insulation member 42, and the U-shaped first metal member 41 together. After the thermal insulation member 42 and the second metal member 43 are fastened together, an end of the second metal member 43 opposing the hole 430 is inclined. The end of the heating plate 48 is compressed between and by the inclined end of the second metal member 43 and a portion of the third heat sink 47. The portion of the third heat sink 47 urges against the inclined surface 441. As a result, the second metal member 43, the heating plate 48, the third heat sink 47, and the first tubular heat sink 44 are fastened together. This also increases capability of dissipating unwanted heat of the heating assembly 40.

When operating the vacuum sealer, a user may lift the presser 30 and place the open end of the plastic bag 50 in a space surrounded by the first sealing ring 16. Next, the user may pivot the presser 30 to press the first sealing ring 16 on the second sealing ring 31. It is noted that the user can clearly check whether the open end of the plastic bag 50 is in a right position or not through the transparent presser 30. If the open end of the plastic bag 50 is in a right position the contact switches 26 are triggered to activate the controller 27 which in turn activates the electric motor 22. It is noted that the two contact switches 26 are required to trigger at the same time prior to being activated for safety purposes. The air in the plastic bag 50 is drawn out via the open end of the plastic bag 50, the suction holes 17, and the tube 23 by the fan 21. The heating assembly 40 is also activated by the controller 27 to cause the heating wire 46 to generate heat which seals the open end of the plastic bag 50 when the pressure sensor 24 senses that a desired vacuum condition (e.g., 500 millibar) has been formed in the tube 23 (i.e., in the plastic bag 50). It is noted that the internal pressure of the plastic bag 50 can reach 500 millibar after the electric motor 22 has been activated for about 10 seconds. Thus, the controller 27 is set to stop the activation of the electric motor 22 after 60 seconds if the internal pressure of the plastic bag 50 does not reach 500 millibar. This is because there is something wrong. Thereafter, the user may check the plastic bag 50 and the vacuum sealer 1. After the open end of the plastic bag 50 has sealed, the electromagnetic valve 25 guides air into the space between the first sealing ring 16 and the second sealing ring 31 to increase pressure to the level of the atmospheric pressure. As a result, the user can lift the presser 30 and remove the sealed plastic bag 50.

The invention further has the following advantages and benefits in comparison with the conventional art: either end of the heating plate 48 does not extend out of the third heat sink 47 or the first heat sink 44. The problems of a suspended portion of the suspended interconnecting member and a potential break thereof is solved. The thermal insulation member 42 can prevent short circuit from being generated. The U-shaped first metal member 41 provides a degree of accommodating extension during heating.

While the invention has been described in terms of preferred embodiments, those skilled in the art will recognize that the invention can be practiced with modifications within the spirit and scope of the appended claims.

What is claimed is:

1. A vacuum sealer, comprising:
   a housing comprising a platform at a front portion;
   a pumping device disposed in a rear portion of the housing and comprising two contact switches on a flat portion of a top of the platform and a controller electrically to the contact switches;
   a presser pivotally disposed on the platform; and
   a heating assembly disposed at a front end of the platform and electrically to the controller, either end of the heating assembly comprising a U-shaped first metal member including two wings wherein one wing has a hole, a thermal insulation member including an internally threaded metal member through the thermal insulation member, a second metal member including a hole, a first tubular heat sink, a first screw driven through the hole of one wing and an end of a heating wire into the first tubular heat sink to fasten the U-shaped first metal member, the heating wire, and the first tubular heat sink together, a plate-shaped third heat sink having one end bent and attached to an end of the first tubular heat sink, a heating plate placed on the third heat sink, and a second screw driven through the hole of the second metal member into the internally threaded metal member wherein a joined portion of the thermal insulation member and the other wing is fastened together by soldering, thereby fastening the second metal member, the thermal insulation member, and the U-shaped first metal member together.

2. The vacuum sealer of claim 1, further comprising a second tubular heat sink threadedly secured to the first tubular heat sink.

3. The vacuum sealer of claim 1, wherein the first tubular heat sink includes an inclined surface; wherein an end of the heating plate is compressed between and by an inclined end of the second metal member and a portion of the third heat sink; wherein the portion of the third heat sink urges against the inclined surface; and wherein the second metal member, the heating plate, the third heat sink, and the first tubular heat sink are fastened together.

* * * * *